United States Patent Office 3,519,969
Patented July 7, 1970

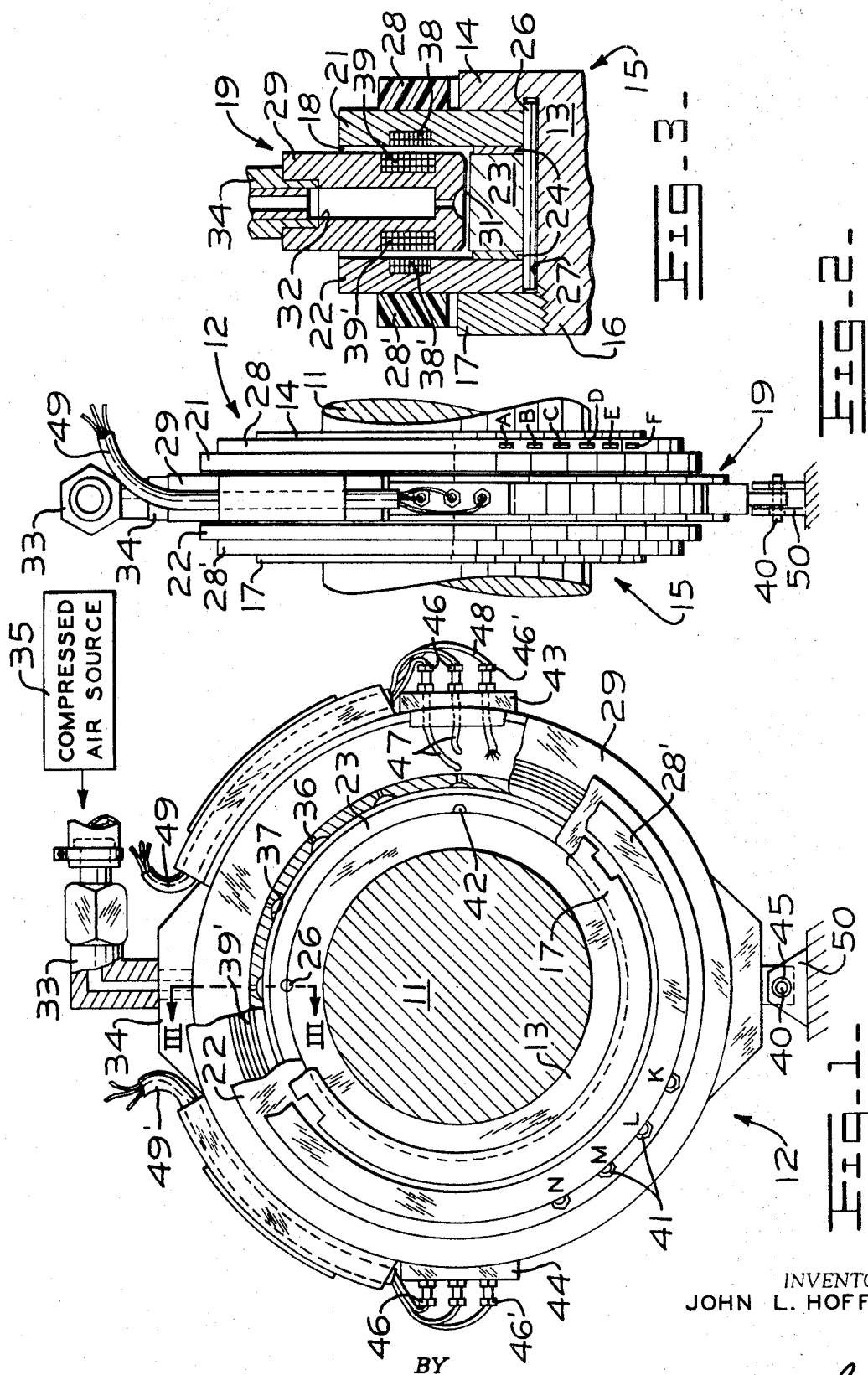

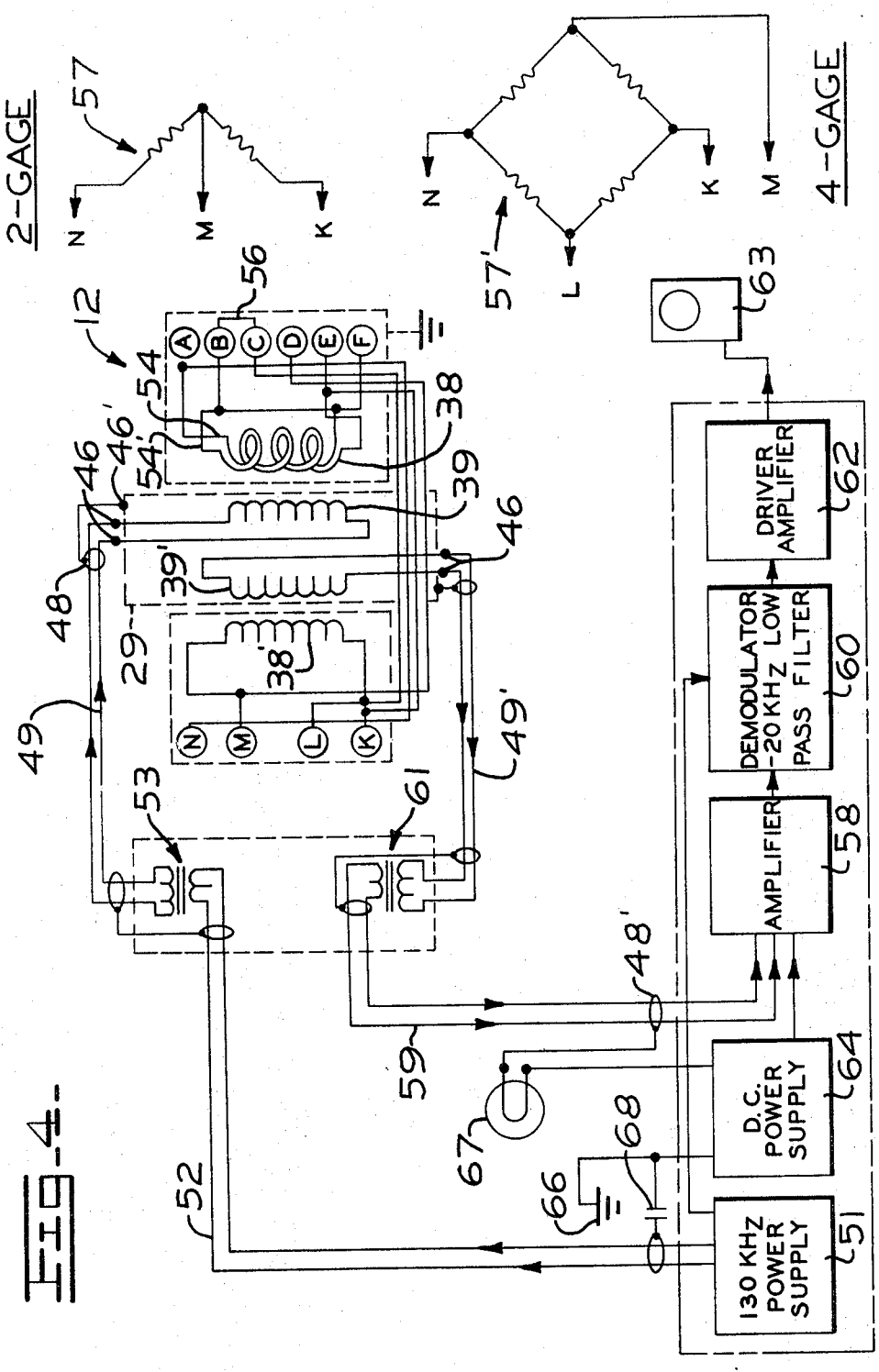

3,519,969
ROTATING TRANSFORMER
John L. Hoffman, East Peoria, Ill., assignor to Caterpillar Tractor Co., Peoria, Ill., a corporation of California
Filed Nov. 12, 1968, Ser. No. 774,668
Int. Cl. H01f 21/06
U.S. Cl. 336—120                                    12 Claims

ABSTRACT OF THE DISCLOSURE

Apparatus for inductively transmitting electrical signals between rotating and stationary structure has a grooved rotor into which a coaxial stator extends, each member having two axially spaced coils whereby a carrier wave signal may be transmitted to the rotating structure by a first pair of coils and a modulated signal may be returned therefrom by another pair. The stator coils are of greater radial extent than the rotor calls whereby signal distortion from radial runout is minimized. The stator is loosely fastened to adjacent stationary structure and air under pressure is forced through the stator into the rotor groove to establish an air bearing action whereby the stator is effectively supported by the rotor without direct contact therewith and without depending on external bearings for support.

BACKGROUND OF THE INVENTION

This invention relates to apparatus for transmitting electrical energy between stationary and rotating elements and more particularly to a compact simplified rotating transformer construction suitable for operation under difficult conditions.

Brushes, slip rings and like devices of the kind commonly used for transmitting an electrical current between rotating and stationary equipment have characteristics which create serious problems under certain operating conditions. Many such devices are bulky and virtually all require frequent servicing. Such devices may not be suitable for use in constricted spaces, in inaccessible locations, in a high temperature environment or in various other specialized situations. Such devices generate considerable friction and this tends to increase sharply as a function of speed. Further, many of these devices are very unsatisfactory for transmitting data, such as strain gage signals, in that electrical noise and other signal distortion is introduced as a result of sparking, radial and axial runout and other causes.

The rotary transformer of inductive slip ring is often employed in situations where the devices discussed above are unsuitable. As heretofore constructed, rotary transformers are not fully free of the aforementioned difficulties and in practice have been subject to undesirable limitations from the same causes. Friction problems are still present, particularly at high speeds, and the inductive coupling between the rotor and stator coils is sensitive to small fluctuations in the radial or axial position of one member relative to the other. This has, heretofore, necessitated the use of precision ball bearings or the like in conjunction with the transformer components and these often require further complication in the form of seals. In addition to the undesirable bulk and structural complexity, lubrication, frequent maintenance and cooling provisions may be required. As a practical matter, there is no commercially available rotary transformer of this kind fully suitable for operation in a very constricted in accessible location in a high temperature environment at very high speeds and in the presence of possible shaft runout of appreciable magnitude. These conditions may all occur, for example, in connection with the taking of strain gauge readings from the principal shaft of a gas turbine engine.

SUMMARY OF THE INVENTION

This invention is a rotary transformer having rotor and stator members which are spaced to define a thin gap into which air or other gas is forced to create an air bearing action therebetween. The stator is thereby effectively supported and positioned by the rotor without direct contact therewith and without requiring, supplementary bearing structure and the related complications. The device is thus extremely compact and has operational characteristics which relieve the problems discussed above. In a preferred form, the invention further provides for minimizing signal distortion from shaft runout and provides for versatility with respect to coupling the transformer to signal generating devices carried on the rotating structure.

Accordingly it is an object of this invention to provide a compact, relatively maintenance-free, low friction rotary transformer capable of operation at very high speeds in the presence of shaft runout and under other difficult conditions.

The invention, together with further objects and advantages thereof will best be understood by reference to the following specification in conjunction with the accompanying drawings.

BRIEF DESCRIPTION OF THE DRAWINGS

In the accompanying drawings:

FIG. 1 is a broken out end view of a rotary transformer in accordance with the invention;

FIG. 2 is a side elevation view of the apparatus of FIG. 1;

FIG. 3 is a partial axial section view of a portion of the apparatus taken along line III—III of FIG. 1; and FIG. 4 is a schematic circuit diagram of the apparatus of FIGS. 1 to 3, together with associated circuitry for obtaining strain gauge signals from a rotating element.

DESCRIPTION OF A PREFERRED EMBODIMENT

Referring now to the drawings and more particularly to FIGS. 1 to 3 in combination, there is shown a rotatable shaft 11 together with a rotary transformer 12 for transmitting electrical signals therefrom. Considering first the construction of the rotating elements of transformer 12, a rotor assembly 15 has an annular sleeve 13 press fitted or otherwise tightly fastened to the shaft 11 in coaxial relationship thereon. As best shown in FIG. 3 in particular, one end of sleeve 13 has a flange 14 and the opposite end 16 is threaded to receive a ring nut 17 which secures the components of the rotor together as will hereinafter be more fully described.

To define a groove 18 around the rotor for the purpose of receiving a stator 19, a pair of axially spaced rotor rings 21 and 22 are carried on the sleeve 13, ring 21 being abutted against flange 14 and ring 22 being abutted against nut 17. To maintain the desired spacing between rotor rings 21 and 22, a band 23 of smaller diameter is situated therebetween with shims 24 being at each end of the band for precise control of the axial dimension of groove 18. The radially inward portions of rotor rings 21 and 22 together with band 23 and shims 24 are held between flange 14 and nut 17. To prevent rotation of the above described elements relative to sleeve 13, a locking pin 26 extends from nut 17 to flange 14 through conforming grooves 27 in the several elements including sleeve 13. Rotor 15 is further provided with an annular terminal ring 28 at each end, the terminal rings being secured to the outer surfaces of rotor rings 21 and 22 by adhesive, for example, and being og greater diameter than ring nut 17 and flange 14. Terminal rings 28 are formed of insulating material and each has a series of terminal posts 41 as will hereinafter be described in more detail.

Stator 19 fits partially within the groove 18 of the rotor 15 and is comprised of an annular stator member 29 disposed between rotor rings 21 and 22 in coaxial relationship therewith. Stator member 29 has an inside diameter slightly greater than the outside diameter of band 23 and has a length in the axial direction which is less than the spacing between rotor rings 21 and 22 to define an aid gap 31 of U-shaped cross section between the rotor and stator elements. Stator member 29 has an annular central chamber 32 and a fitting 33 is mounted at an enlargement 34 at the top of the stator member to admit a flow of air under pressure to chamber 32. Equiangularly spaced around the inner surface of stator member 29 are a plurality of radially directed air passages 36 which communicate chamber 32 with gap 31 at the central plane of the stator. A concave pocket enlargement 37 is provided at the inner end of each passage 36 to improve the aid flow characteristics.

In operation, air from a suitable pressurized source 35 is admitted into stator member chamber 32 through fitting 33 thereby creating an air flow through passages 36 which divides and flows axially and then radially outward along both legs of gap 31. The system thus functions in the manner of an air bearing in that the fluid pressure within gap 31 urges the stator member 29 towards a centered position relative to the axis of the rotor 15 and further centers the stator member between rotor rings 21 and 22. Thus, under operating conditions, there is normally no contact between elements of the stator and the rotor and relatively little friction therebetween. Further, the air bearing forces cause the stator 19 to shift in the presence of axial or radial runout of the shaft 11 to maintain the coaxial relationship of stator and rotor elements. The air flow has the further effect of cooling the transformer and this may be a very significant advantage during high speed operation or in a high temperature environment.

As the stator 19 is supported and positioned in operation by the air flow described above, it is not rigidly fastened to adjacent stationary structure. However, under some conditions, the torque exerted on the stator through fluid friction and from other causes, may tend to turn the stator and thus a loose connection to adjacent stationary structure may be desirable. In some instances, the flexible air hose and electrical cables which connect to the stator may be sufficient to constrain the stator against rotation. In the present example, these are supplemented by axially extending pins 40 at the base of stator member 29 which enter openings 45 of larger diameter in a bracket 50 secured to adjacent stationary structure.

To transmit an electrical signal between the stator and rotor, a first rotor coil 38 is inset in the surface of rotor ring 21 which faces the stator across gap 18. Coil 38, which is bifilar in the present instance, coacts with a first stator coil 39 set in the facing surface of stator member 29. In order to minimize variations in coupling resulting from relative radial movement of the rotor and stator, one of the two coils 38 and 39 is dimensioned to have both a greater outside diameter and a lesser inside diameter than the other whereby it overlaps the other in the radial direction, the stator coil 39 being of greater radial extent in this example.

In some usages of rotary transformers of this kind, a single pair of coils ar esufficient to transmit the desired signal between rotating and stationary elements. In other instances such as in the present example, a plurality of rotor and stator coils are needed. In this embodiment, two sets are required in that one serves to energize instrumentation on the rotating members while the other pair of coils serve to transmit an output signal back to the stationary structure. More specifically, as will hereinafter be discussed in more detail, the present example is adapted for supplying a carrier wave of uniform amplitude to a strain gauge bridge carried on the rotating shaft and requires a second information channel to return a modulated signal. Accordingly, a second rotor coil 38' is inset into the surface of rotor ring 22 which faces the stator member 29 and a second stator coil 39' is inset in the facing surface of stator member 29. Again, the stator coil 39 is of greater extent in the radial direction and overlaps the rotor coil 38' as previously described, to provide relatively constant inductive coupling in the presence of small radial motions of one coil relative to the other.

To provide for electrical connections to the rotor coils 38 and 38', a series of the terminal posts 41 are mounted on each of the terminal rings 28, six posts identified by letters A to F being on the terminal ring adjacent coil 38 and four posts identified by letters N, M, L and K are situated on the opposite terminal ring. As will hereinafter be discussed in more detail, the invention provides for connecting rotating electrical components at either side of the rotor assembly 15 and for this purpose a passage 42 extends along the inner surface of sleeve 23 in the axial direction to provide for the interconnection of certain terminals 41 of the two terminal rings.

To provide for electrical connections to the stator coils 39 and 39', a pair of terminal blocks 43 and 44 are situated on stator member 29 at opposite sides thereof and each is provided with three terminals 46. Two of the terminals 46 at each terminal block couple to an associated one of the stator coils 39 through suitable insulated conductors 47 while the third terminal provides for connecting stator member 29 with the shields 48 of twin conductor cables 49 which connect the stator with remotely located circuitry to be hereinafter described.

The several principal components of the transformer as described above are formed of conductive non-magnetic materials such as stainless steel or aluminum, with the exception of the terminal rings 28 which are insulative material. Preferably the stator member 29 is formed of a relatively light material such as aluminum to facilitate the supporting of the stator by air pressure. Although the described construction results in sizeable eddy currents in the rotor rings 21 and 22 and in stator member 29, this is generally beneficial in that the electromagnetic shielding effect which results reduces flux leakage and minimizes cross talk. The loading effect from eddy currents is small compared to the load introduced by a typical 120 ohm or 240 ohm bridge. Eddy current problems can be offset somewhat, if desirable, by cementing high permeability thin steel foil in the bottom of the coil grooves prior to installing the coil windings.

It will be apparent to those skilled in the art that a variety of electrical connections may be made to the above described structure depending on the kind of electrical signals which are to be transmitted between the rotating and stationary components. Certain of the structural features described above make the transformer very versatile with respect to the variety of data which may be handled and with respect to the physical arrangement of the necessary electrical connections. This versatility is best understood by briefly considering a specific example of the interconnection of the transformer 12 with external circuitry. For this purpose, FIG. 4 schematically shows the connections employed where the rotary transformer 12 is utilized to obtain strain gage data from rotating structure mounted on shaft 11. A source of constant amplitude carrier wave excitation such as a 130 kHz. power supply 51 is coupled to the first stator coil 39 through shielded two conductor line 52 and impedance matching transformer 53, at the previously described terminals 46, the third terminal 46' being employed to ground the shield of line 52 to stator member 29. The carrier wave excitation signal is thus inductively coupled from stator coil 39 to first rotor coil 38.

To provide for connection of a strain gauge to first rotor coil 38 at either side of the rotary transformer 12, a first winding 54 of the bifilar coil 38 has one end connected to previously described terminal A and the other end connected to terminal F and also to terminal B. Terminal B may be selectively coupled to terminal C by a removable jumper connector 56 and terminal C is coupled to terminals K and L at the opposite side of the transformer. The second winding 54' of bifilar coil 38 has one end connected to terminal B and terminal F and the other end connected to terminal E and to terminal K at the opposite side of the transformer.

The second or output rotor coil 38' has a single winding with one end connected to terminal M and to terminal D at the opposite side of the transformer. The second end of coil 38' connects to terminals L and K and thus to terminal C at the opposite side.

The above described terminal arrangements and interconnections to rotor coils 38 and 38' provide for use of either a two element strain gauge bridge 57 or a four element bridge 57' on the rotating structure and the bridge may be connected at either side of the rotary transformer. The three terminals of a two-gauge bridge 57, for example, may be connected to terminals N, M and K at one side of the transformer or alternately may be connected to terminals A, D and E at the other side, the jumper connection 56 being utilized in either arrangement. Alternately, the four element bridge 57' may be utilized by connecting the four terminals thereof to terminals N, L, K and M respectively at one side of the transformer 12 or by connecting the same bridge terminals to A, C, E and D at the other side of the transformer, the jumper 56 being removed in this case.

The bridge 57 or 57' acts to modulate the applied carrier wave in the manner known to the art and the modulated wave is inductively transferred from rotor coil 38' to stator coil 39'. The modulated signal is then transmitted to an amplifier 58 through a shielded twin conductor line 59 and an impedance matching transformer 61 coupled to stator output terminals 46. From the amplifier 58 the signal may be coupled to a demodulator 60 with the demodulated signal being transmitted to a driver amplifier 62 for display at a cathode ray tube 63.

It is highly desirable that means be provided to quickly detect and indicate any contact of the stator member 29 with elements of the rotor 15. For this purpose a low voltage DC power supply 64 is provided having one output terminal connected to a ground 66 and having the other output terminal connected to the conductive shield 48' of one of the twin conductor cables which connect with the stator, the connection in this instance being made through the cable 49' which couples the stator to amplifier 58. The connection between power supply 64 and shield conductor 48' is made through an indicator lamp 67. Since the stator member 29 is maintained out of contact with the rotor structure 15 during operation, by the air bearing action hereinbefore described, the DC circuit is normally open. Since the rotor elements are grounded, through the bearings or the like which support the shaft 11, the DC circuit closes if stator member 29 touches the rotor 15 and thus lamp 67 lights to provide visual indication that the contact is occuring. It will be apparent that an audible alarm or similar means may be used in place of the lamp 67 or in conjunction therewith.

To avoid activating lamp 67 when the stator member 29 is not contacting the rotor 15, it is necessary that the air supply connection to the stator, previously described with reference to FIG. 1, be made through non-conductive material at least a portion of the hose or associated fittings being formed of an insulating material, for example. Similarly the pins 40 which loosely fasten the stator member 29 to adjacent stationary structure as previously described, or the brackets 50 associated therewith, should be formed of insulating material such as a suitable plastic to avoid grounding of the stator. For similar reasons, referring again to FIG. 4, the shield 48 of the other twin conductor cable 49 which connects the stator with he carrier wave power supply 51 is not directly grounded but may be coupled to ground 66 through a capacitor 68 to provide a ground for transient voltages.

While the invention has been disclosed with respect to a particular example, it will be apparent that many modifications are possible and it is not intended to limit the invention except as defined in the following claims.

What is claimed is:

1. Apparatus for transmitting electrical energy between rotating and stationary structure comprising:
   an annular rotor carried on said rotating structure and having a rotor coil,
   an annular stator disposed coaxially with respect to said rotor in radially spaced relationship therefrom whereby a gap is present between said rotor and stator, said stator being movable in a radial direction relative to said rotor and having a stator coil for inductively coupling to said rotor coil to transmit said signals herebetween, and
   means applying a gas under pressure to said gap between said rotor and stator to maintain said radial spacing without direct contact therebetween.

2. Apparatus as defined in claim 1 further comprising means loosely connecting said stator to said stationary structure whereby said stator is constrained against rotation while being capable of limited radial movement.

3. Apparatus as defined in claim 1 wherein said rotor has a groove therearound and wherein at least the radially innermost portion of said stator extends into said groove, said stator having an inside diameter greater than the outside diameter of said rotor at the base of said groove and having an axial length less than the spacing of the sides of said groove whereby said gap between said rotor and stator has a U-shaped profile.

4. Apparatus as defined in claim 3 wherein said gas under pressure is admitted to said gap through said stator through radially directed passages therein which are equidistant from opposite ends of said stator.

5. Apparatus as defined in claim 1 wherein said rotor coil and stator coil are disposed in an axially spaced end-to-end relationship to each other.

6. Apparatus as defined in claim 5 wherein one of said coils has a greater outer diameter and a lesser inner diameter than the other thereof whereby coupling variations are minimized in the presence of radial movement of one of said coils relative to the other.

7. Apparatus as defined in claim 1 wherein said stator is formed at least in part of a material which is lighter than the material of said rotor.

8. Apparatus as defined in claim 1 wherein at least adjacent portions of said rotor and said stator are formed of electrically conductive material, said apparatus further comprising an electrically operated indicator device, and a power supply connected between said conductive portions of said rotor and stator through said indicator device whereby said evice is activate upon contact between said rotor and said stator.

9. Apparatus for transmitting electrical signals between rotating and stationary structure comprising:
   an annular rotor secured to s aid shaft in coaxial relationship thereon, said rotor having axially spaced ring members with a sleeve therebetween of lesser diameter thereby forming a circumferential groove around said rotor,
   an annular stator disposed coaxially around said shaft and having at least a radially innermost portion within said groove of said rotor, said stator having an inside diameter greater than the diameter of said sleeve and having an axial length less than the spacing of said rotor rings whereby a gap of U-shaped cross section is present between said rotor and said stator when said elements are in precise coaxial relationship, means for forcing air under pressure into said gap to initiate an air bearing action therein whereby said stator is supported by said rotor in spaced relationship therefrom, a pair of rotor coils each being carried in a separate one of said rotor rings, and a pair of axially spaced stator coils on said stator each being spaned from a separate one of said rotor coils by said gap for inductively coupling thereto whereby signals may be transmitted from said stationary structure to said rotating structure through a first of said stator coils and rotor coils and signals may be transmitted back from said rotating structure through the second of said rotor coils and stator coils.

10. Apparatus as defined in claim 9 further comprising at least a pair of terminals carried on said rotor at a first end thereof and being connected to one of said rotor coils, and a second pair of terminals carried on the opposite end of said rotor and being connected to said first pair of terminals whereby components carried on said rotating structure may be coupled to said first coil at either end of said rotor.

11. Apparatus as defined in claim 9 wherein at least one of said rotor coils is bifilar with each component conductor thereof being connected to separate terminals at said rotor.

12. Apparatus as defined in claim 9 wherein a first of said rotor coils is bifilar with a first winding conductor having opposite ends connected to first and second terminals at a first end of said rotor and having a second winding conductor with ends connected to third and fourth terminals on the same end of said rotor and wherein the second of said rotor coils has a single winding conductor with opposite ends connected to fifth and sixth terminals at the other end of said rotor and wherein a seventh terminal situated at said other end of said rotor is connected to said first terminal at said first end of said rotor, an eighth terminal at said first end of said rotor connected to said fifth terminal, a ninth terminal on said first end of said rotor connected to said sixth terminal, and further comprising means for selectively connecting said third and ninth terminals whereby said apparatus may be used in conjunction with differing forms of bridge circuit on said rotating structure.

References Cited

UNITED STATES PATENTS

| 2,548,397 | 4/1951 | Schaevitz. | |
| 2,624,783 | 1/1953 | Nedzel | 336—120 XR |
| 2,937,294 | 5/1960 | Macks | 310—90 |
| 3,134,037 | 5/1964 | Upton | 310—90 |
| 3,179,909 | 4/1965 | Cheney | 336—132 XR |
| 3,441,886 | 4/1969 | Tueter | 336—123 XR |

THOMAS J. KOZMA, Primary Examiner

U.S. Cl. X.R.

73—136; 310—90; 336—123; 340—269

PO-1050
(5/69)

UNITED STATES PATENT OFFICE
CERTIFICATE OF CORRECTION

Patent No. 3,519,969          Dated July 7, 1970

Inventor(s) JOHN L. HOFFMAN

It is certified that error appears in the above-identified patent and that said Letters Patent are hereby corrected as shown below:

Column 6, line 24, "herebetween" should be --therebetween--.

Column 7, line 12 "spaned" should be --spaced--.

SIGNED AND
SEALED
OCT 13 1970

(SEAL)
Attest:

Edward M. Fletcher, Jr.
Attesting Officer

WILLIAM E. SCHUYLER, JR.
Commissioner of Patents